United States Patent
Ha et al.

(10) Patent No.: US 7,083,318 B2
(45) Date of Patent: Aug. 1, 2006

(54) LIQUID CRYSTAL DISPLAY DEVICE AND BACKLIGHT THEREOF

(75) Inventors: Kyoung Su Ha, Pusan (KR); Myong Gi Jang, Kyungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 153 days.

(21) Appl. No.: 10/673,447

(22) Filed: Sep. 30, 2003

(65) Prior Publication Data

US 2004/0062057 A1 Apr. 1, 2004

Related U.S. Application Data

(62) Division of application No. 09/520,880, filed on Apr. 5, 2000, now Pat. No. 6,690,435.

(30) Foreign Application Priority Data

Apr. 30, 1999 (KR) .............................. 1999-15641

(51) Int. Cl.
*F21X 7/04* (2006.01)
(52) U.S. Cl. .................... 362/633; 362/561; 349/58; 349/65
(58) Field of Classification Search ............... 362/561, 362/615, 618, 632, 633, 26, 27; 349/58, 349/60, 65, 61
See application file for complete search history.

(56) References Cited

U.S. PATENT DOCUMENTS

| | | | | |
|---|---|---|---|---|
| 6,016,175 A * | 1/2000 | Kim | .............................. | 349/58 |
| 6,064,455 A * | 5/2000 | Kim | .............................. | 349/113 |
| 6,181,071 B1 * | 1/2001 | Yuuki et al. | .............. | 315/169.3 |
| 6,201,586 B1 * | 3/2001 | Nakayama | .................... | 349/58 |
| 6,690,435 B1 * | 2/2004 | Ha et al. | ....................... | 349/61 |

\* cited by examiner

*Primary Examiner*—John Anthony Ward
(74) *Attorney, Agent, or Firm*—Birch, Stewart, Kolasch & Birch, LLP

(57) ABSTRACT

In a liquid crystal display device according to the present invention, an upper end portion of a lamp housing is fixed on a main supporter so that the lamp housing can be made to face a side edge of a light guide. Light that can cause bright lines is eliminated or minimized through absorption or scattering by a main supporter. The main supporter is also thermally insulating and is placed between the lamp housing and a liquid crystal panel. Further, a thermally conducting bottom cover is placed under the backlight. Therefore, heat generated from the lamp is effectively channeled away from the light guide to prevent liquid crystal panel deterioration. Still further, although the upper and lower surfaces of the light guide is tightly fit between the lamp housing and the main supporter, wrinkles on a sheet reflector are prevented because the sheet reflector is not stacked between the lamp housing and a lower surface of the light guide.

28 Claims, 4 Drawing Sheets

LIQUID CRYSTAL DISPLAY DEVICE AND BACKLIGHT THEREOF

CROSS-REFERENCES TO RELATED APPLICATIONS

This application is a divisional of U.S. application Ser. No. 09/520,880 filed on Apr. 5, 2000 now issued as U.S. Pat. No. 6,690,435. This nonprovisional application claims priority under 35 U.S.C. § 119(a) on Patent Application No. 1999-15641 filed in Korea on Apr. 30, 1999. The entirety of each of the above-identified documents are hereby incorporated by reference.

BACKGROUND OF THE INVENTION

The present invention relates to a liquid crystal display device and a backlight thereof. More specifically, the present invention relates to preventing the deterioration of liquid crystal panel and preventing the generation of wrinkles on a sheet reflector while decreasing generations of a bright line and/or a black line.

A liquid crystal display device (LCD) has been widely used as a display for notebook computers and portable TVs among others. An LCD fundamentally includes a liquid crystal panel and a backlight applying a lamp light to the liquid crystal panel. The liquid crystal panel typically comprises an upper substrate, a lower substrate, and a liquid crystal layer between the two substrates.

FIG. 1 is a sectional view showing a position of a lamp of a conventional LCD device including a liquid crystal panel and a backlight. The liquid crystal panel 24 comprises an upper substrate 7, a lower substrate 6, a liquid crystal layer between the two substrates (not shown), an analyzer 8 adhered to an upper surface of the upper substrate 7 and a polarizer 5 adhered to a lower surface of the lower substrate 6.

The backlight comprises a light guide 3, a lamp 10 facing a side edge of the light guide 3, a lamp wire 21, a lamp housing 9, a sheet reflector 2 situated below the light guide 3, and a plurality optical films 4 adhered to an upper surface of the light guide 3. The lamp wire 21 supplies power to the lamp 10, and the lamp housing 9 protects the lamp 10 and directs the light therefrom to the light guide 3 through the side edge of the light guide.

The conventional LCD device also includes a pad 23, a main supporter 1, and a top case 22, which is connected to a side of the main supporter and an upper end of the liquid crystal panel 24. Pad 23 is situated between an upper surface of the upper end of the lamp housing 9 and the lower surface of the lower substrate to support the liquid crystal panel 24. The main supporter 1 shields the lower portion and the side of the backlight protects and supports the backlight. The top case 22 fixes the liquid crystal panel 24 to the main supporter 1.

The conventional LCD device has following problems.

First, after the construction, the edge of light guide 3 is placed between both upper and lower extensions of the lamp housing 9. To prevent wrinkles on the sheet reflector 2 with this construction, a gap must occur between the upper surface of the light guide 3 and the lower surface of the upper end of the lamp housing 9.

Normally, light from the lamp 10 is incident upon the side edge of the light guide 3 so that the light density, emitted through the upper surface of the liquid crystal display panel 24, is uniform over a wide region. However, the gap created by the above construction results in some of the light rays being reflected from the lamp housing 9 so as to be incident upon the upper surface of the light guide 3, as shown in FIG. 2. Thus, instead of the desired uniform light brightness, a bright line is created.

To counteract the bright line creation, a black color is printed on an area A of the sheet reflector 2. Unfortunately, if the print density is too great, then a black line is generated, and if the print density is too slight, then the bright line will still be generated.

Second, to prevent the bright line, the aperture of the lamp housing 9 can be made narrow. However, such narrowing of the opening causes the a portion of sheet reflector 2 above the lower extension of the lamp housing 9 to be pressed by the same lower extension. As a result, wrinkles are generated on the sheet reflector 2, especially at high temperatures.

Third, heat generated from the lamp 10 is transmitted to the liquid crystal panel 24 and thereby causing the liquid crystal to deteriorate.

SUMMARY OF THE INVENTION

In order to overcome the problems according to the conventional art, the present invention provides an LCD device including a backlight thereof in which the generation of a bright line and/or a black line is prevented, the deterioration of the liquid crystal generated is prevented, and the generation of wrinkles is prevented on a sheet reflector.

In order to achieve the objects described above, the liquid crystal display device according to the present invention comprises:

A liquid crystal panel; a light guide including the first surface which faces the liquid crystal panel as an upper side, the second surface as a lower side, a plane of incident ray on at least one end surface; a lamp facing the plane of incident rays; a lamp housing including the first end portion provided on the first surface, the second end portion provided on the second surface as two end portions which has a regular intervals with the perpendicular direction to the first surface and an inner side holding the lamp.

Also, the liquid crystal display device also includes a main supporter between the lamp housing and the liquid crystal panel; wherein the first boundary which is situated between the first end portion and the inner side is situated between the first expanded surface having the perpendicular direction to the plane of the incident rays, as an imaginary expanded surface of the first surface and the second expanded surface having the perpendicular direction to the plane of the incident rays, as an imaginary expanded surface of the second surface; the end portion in the direction of the plane of incident rays in the sheet reflector, in which the end portion is confronted with the second surface, is further than the second end portion on the basis of the plane of the incident rays.

An upper end portion of a lamp housing is fixed on the main supporter, so that the lamp housing can be controlled to confront with a plane of incident rays at a light guide for a correct position. Also a causative light of a bright line which is streaming through the corner of a upper surface of the light guide is effectively intercepted and the causative light is scattered or absorbed by the main supporter.

Further, the main supporter intercepts heat moving from a lamp to a liquid crystal panel, so that a deterioration of liquid crystal is decreased.

And, the sheet reflector is not inserted between the lamp housing and a lower surface of the light guide, so that though the upper and lower surface of the light guide is intensively fitted by the lamp housing and the main supporter, wrinkles are not generated on the sheet reflector and the whole thickness of the backlight can be decreased as much as thickness of the sheet reflector.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF THE INVENTION

Figure 3A:
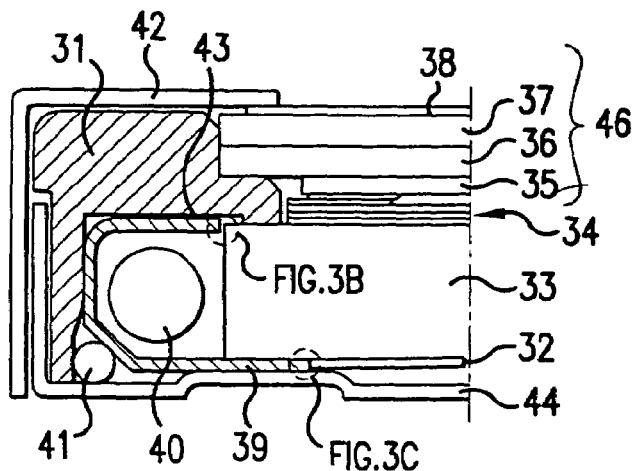
FIGS. 3A, 3B and 3C are sectional views showing an LCD device according to a first embodiment of the present invention.

FIG. 3A is a view showing a first embodiment of the present invention. A backlight of the first embodiment comprises a light guide 33, a lamp 40 facing a side edge of the light guide 33, a lamp wire 41 to supply power to the lamp 40, a lamp housing 39 to protect and shield the lamp 40 and to direct light to the side edge of the light guide 33, a sheet reflector 32 situated below a lower surface of the light guide 33, and a plurality optical films 34 situated above an upper surface of the light guide 33.

Figure 1:
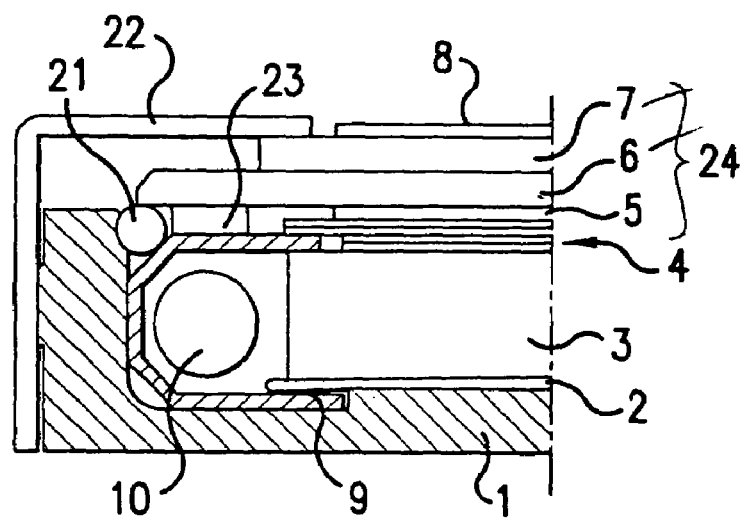
FIG. 1 is a sectional view showing an LCD device according to the conventional art.
Figure 3B:
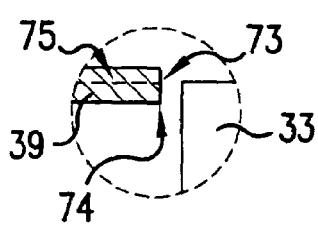
Figure 3C:
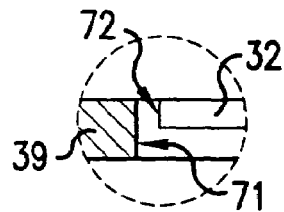

In the conventional art, as shown in FIG. 1, the end portion of the sheet reflector 2 is inserted between the lower surface of the light guide 3 and the lower extension of the lamp housing 9. But in the first embodiment, as shown in FIG. 3C, an end portion 72 of the sheet reflector 32 and the end portion 71 of the lower extension of the lamp housing 39 are apart from each other. As a result, the sheet reflector 32 is not pressed by the lamp housing 39, which prevents wrinkles from being generated on the sheet reflector 32.

Also as a shown in FIG. 1, the conventional LCD device has a portion of the upper extension of the lamp housing 9 extends over a portion of the upper surface of the light guide 3. In the first embodiment according to the present invention (as shown in more detail in FIG. 3B), however, at least a portion of the side edge 73 of the upper extension of the lamp housing 39 faces the side edge of the light guide 33. In other words, no vertical gap exists between the upper surface of the light guide 33 and the lower surface of the upper extension of the lamp housing 39, as is the case in the conventional art.

Figure 4:
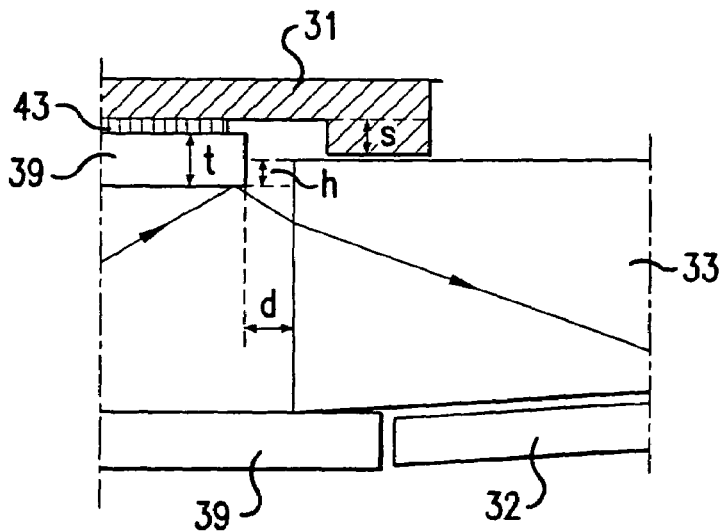
FIG. 4 is a view explaining effects of the first embodiment.

The lack of a vertical gap prevents a bright line from being created. As shown in FIG. 4, light rays reflected from the lower surface of the upper extension still enters the light guide 33 through the side edge instead of entering through the upper surface as in the conventional art. This construction has an additional advantage in that overall brightness is increased since more light enters through the side edge of the light guide 33.

It is true that some amount of light will enter the horizontal gap between the lamp housing 39 and the light guide 33 and be reflected from a main supporter 31. However, any bright line effect created by such light is insignificant for two reasons. First, the amount of light that enters the gap to be reflected is so small as to be negligible. Second, the amount light actually reflected onto the upper surface of the light guide 33 is further reduced through absorption by the end 73 of the upper extension of the lamp housing 39 and by the main supporter 31.

As shown in FIG. 3, a liquid crystal panel 46 comprises an upper substrate 37, a lower substrate 36, a liquid crystal layer between the two substrates (not shown), an analyzer 38 adhered on the upper surface of the upper substrate 37, and polarizer 35 adhered to the lower surface of the lower substrate 36. The liquid crystal panel 46 is situated on the optical film 34 of the backlight.

The LCD device of the first embodiments also includes a bottom cover 44, which generally covers side and bottom of the LCD device including the backlight. The device also includes a top case 42, which covers a portion the upper edge of the liquid crystal panel 46 above the side edge of the light guide 33 as well as a side portion of the bottom cover 44. The bottom cover 44 is composed of thermally conducting materials such as metals. The top case 42 and the bottom cover 44 may be formed as a single unit.

As shown in FIG. 3A, the main supporter 31 is adjoined with a lower edge of the liquid crystal panel 46 to provide support to the liquid crystal panel 46. Also one end portion of the main supporter 31 is above the upper surface of the light guide 33, and the other end portion is aside an inner surface of the bottom cover 44. The main supporter 31 is composed of thermally insulating materials such as plastics. Also, it is preferred that the main supporter 31 is composed of a material that scatters or absorbs light.

Note that the main supporter 31 has an end portion that is between the liquid crystal panel 46 and the lamp housing 39. Because the main supporter 31 is thermally insulating, most of the heat generated from the lamp 40 is transferred outside through the lamp housing 39 and through the bottom cover 44 and top case 42, which are thermally conducting, without transmitting the heat into the liquid crystal panel 46. This prevents or minimizes the deterioration of the liquid crystal panel 46.

Further, the light rays that enter the horizontal gap between the end 73 of the upper extension of the lamp housing 39 and the side edge of the light guide 33 are scattered or absorbed by the main supporter 31, which prevents or minimizes bright lines from occurring.

The lamp housing 39 is fixed onto the main supporter 31 by a double-faced adhesive tape 43 which is placed between an outer side of the lamp housing 39 and an inner side of the main supporter 31. An upper portion of the main supporter 31 is formed higher than the end portion of the main supporter, which is connected with the upper surface of the light guide. In this case, another fixing technology can be used above and beyond the double-faced adhesive tape to minutely control the position of the end portion of the upper extension of the lamp housing 39.

Note that above the upper surface and below the lower surface of the light guide 33, the end portion of the main supporter 31 and the lower extension of the lamp housing 39 are placed, respectively. The light guide 33 is tightly fit between the main supporter 31 and the lamp housing 39. This differs from the conventional art shown in FIG. 1 in which the sheet reflector 2 is inserted between the lower extension of the housing 9 and the lower surface of the light guide 3. A tight fit under this condition results in wrinkles being generated on the sheet reflector 2.

Figure 2:
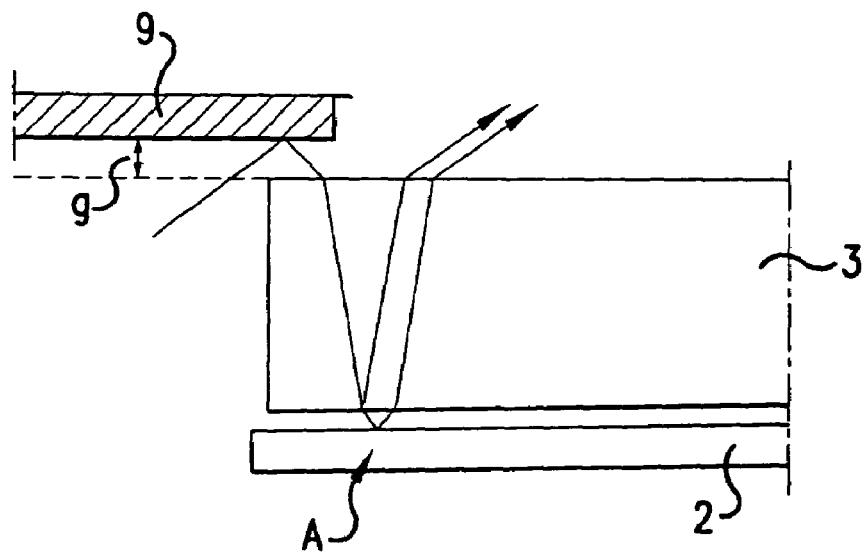
FIG. 2 is a sectional view explaining the reason why a bright line is generated in an LCD device according to the conventional art.

To prevent wrinkles in the convention art, a gap g of about 0.1 mm is created between the upper surface of the light guide 3 and the upper extension of the lamp housing 9, as shown in FIG. 2. Also, the thickness of the light guide 3 and the position of the upper extension of the lamp housing 9 have a tolerance of about ±0.1 mm. Thus, the gap g could be as much as 0.2 mm. If the gap is so large, the bright line cannot be prevented.

But in the first embodiment, as shown in FIG. 3C, the sheet reflector 32 is not inserted between the lower extension of the lamp housing 39 and the lower surface of the light guide 33. This allows for the light guide 33 to be tightly fit between the main supporter 31 and the lower extension of the lamp housing 39 without a concern that the sheet reflector 32 will be wrinkled. The tight fit dramatically reduces the gap between the upper surface of the light guide and the main supporter, which in turn prevents or minimizes the creation of bright lines.

Figure 5:
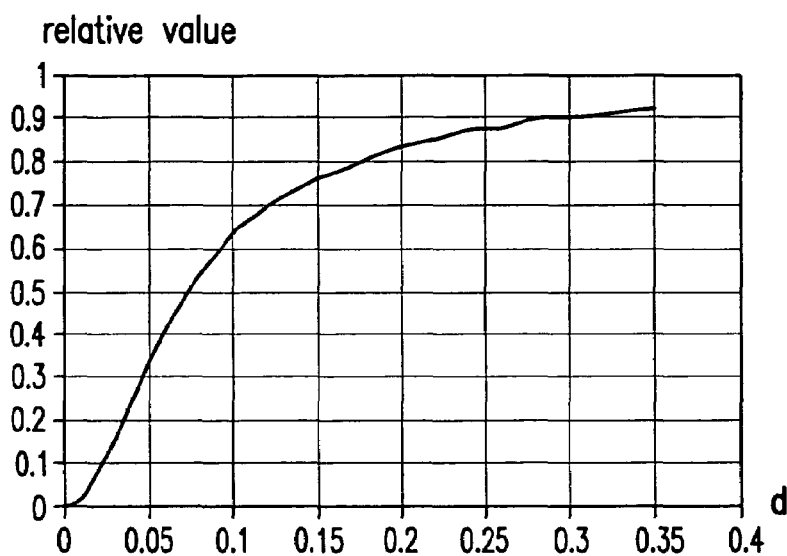
FIG. 5 is a graph showing a relative value of a luminous intensity of a bright line according to the first embodiment to the luminous intensity of a bright line according to the conventional art, depending on a distance d shown in FIG. 4.

FIG. 5 is a graph showing a relative value of a luminous intensity of the bright line of the first embodiment to a luminous intensity of the bright line according to the conventional art, depending on the gap d shown in FIG. 4. The graph reflects a situation where height difference h between the upper surface of the light guide 33 and the lower surface of the upper extension of the lamp housing has been fixed to 0.1 mm. In this instance, the lower surface of the upper extension has been fixed to be above the upper surface of the light guide (unlike the situation depicted in FIG. 4). The relative luminosity values have been calculated by using the direction distribution of light near the end portion of the upper extension of the lamp housing. The distribution is obtained from measuring samples under a condition that space above the upper surface of the light guide is 0.1 mm in both the conventional art and the first embodiment.

As shown in graph, when the horizontal gap d is 0.1 mm or less (i.e. the ratio of the horizontal gap to the vertical gap is 1 or less), the relative luminosity value is 0.6 or less as compared to the conventional art. That is, the strength of a bright line is considerably decreased in the first embodiment.

As noted above, the graph of FIG. 5 represents data generated under the condition where a significant gap (0.1 mm) exists between the upper surface of the light guide 33 and the lower surface of the upper extension of the main housing 39. Stated in another way, this situation depicts a very loose fit. But also as noted above, the fit can be tightened to where the gap is much less than 0.1 mm, which will significantly decrease the bright line strength.

Referring back to FIG. 4, it is desirable to have the height h, the distance at which the upper surface of the light guide 33 is above the lower surface of the upper extension of the lamp housing 39, be as close to zero as possible to maximize the amount of light from the lamp 40 entering the side edge of the light guide 33 without increasing the bright line strength. The height h is determined by the step difference s of the main supporter 31, the thickness t of the lamp housing 39, and the thickness of the adhesives. All these factors can be controlled within 0.1 mm tolerance. Thus, the height h can be very accurately produced, i.e. to within 0.05 mm or less. As a result, light incident to the side edge of the light guide 33 can be maximized while effectively excluding creation of bright lines.

As described above, upper extension of the lamp housing 39 does not contact the light guide 33. However, it is possible that an external shock may jar the device such that the lamp housing and the light guide collide. If this occurs, the light guide maybe damaged to spill impurities from the light guide to the liquid crystal panel causing spots on the LCD screen. To ensure that the chance of collision is minimized, the lamp housing 39 is affixed to the main supporter 31 by a double-faced adhesive tape 43.

Figure 6A:
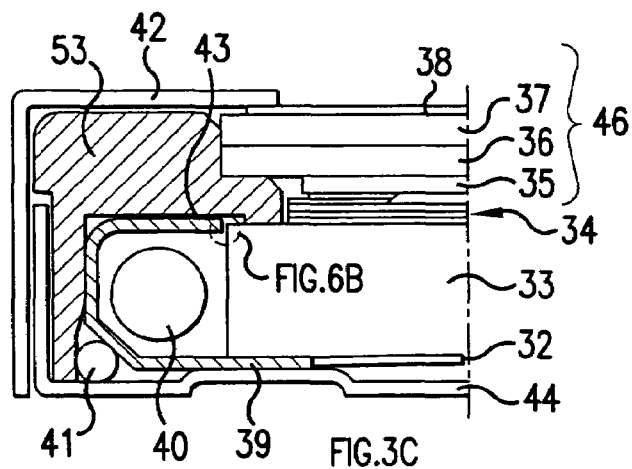
FIGS. 6A and 6B are sectional views showing another practical structure according to the present invention.
Figure 6B:
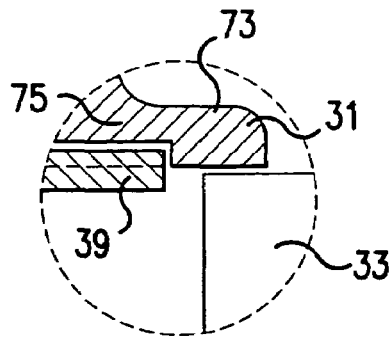

FIGS. 6A and 6B show a further step that can be taken to minimize the chance of collision. As shown in more detail in FIG. 6B, a portion of the main supporter 31 above the upper surface of the light guide 33 extends into the space (gap d of FIG. 4) where the upper extension of the lamp housing 39 and the side edge of the light guide 33 are kept apart. Here, a part 75 of the end 73 of the upper extension (the part that is above the upper surface of the light guide 33) rests against the extended portion of the main supporter 31, thereby ensuring collision will not occur.

However, because gap d exists, some amount of light may enter through the gap d. In the conventional art, the light entering in such a manner was reflected to enter the light guide 33 through the upper surface causing bright lines. In the first embodiment, however, the main supporter 31 is made of a material that absorbs and scatters light. Thus, the light that enters through the gap d is scattered or absorbed preventing bright lines.

Referring back to FIG. 3, a black line can be generated from light that escapes through a space between the end portion 72 of the lower extension of the lamp housing 39 and the sheet reflector 32. To prevent or minimize black lines from occurring, the bottom cover 44 can be made of appropriate materials.

Figure 7:
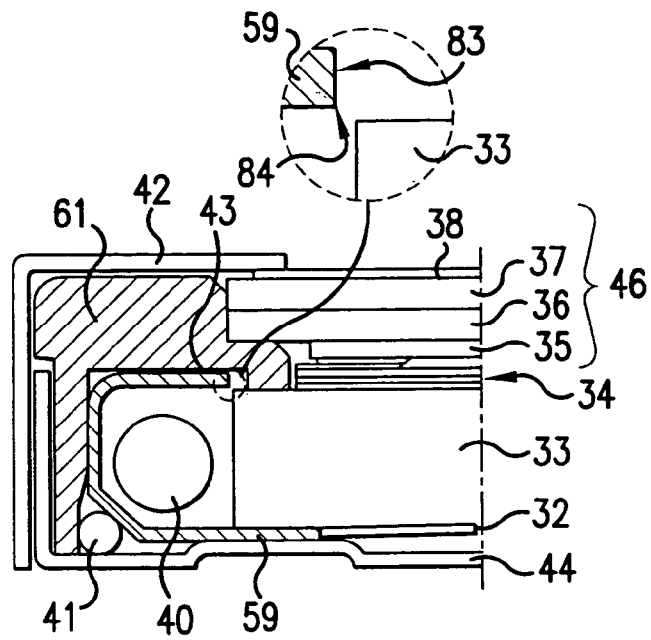
FIG. 7 is a sectional view showing a second embodiment of the present invention.

FIG. 7 is a view showing a second embodiment according to the present invention. Elements having the same structure as the first embodiment are represented with same reference numbers, and related explanations are omitted.

In the second embodiment, the end portion 83 of the upper extension of the lamp housing 59 does not face the side edge the light guide 33. That is, the upper extension of the lamp housing 59 is entirely above the upper surface of the light guide 33.

In this structure, the inner space of the lamp housing 59 is wider than the inner space of the lamp housing of the first embodiment. This in turn decreases the amount of light being absorbed after being reflected back into the lamp 40 is decreased, and increases the amount of light entering the side edge of the light guide 33 when compared to the first embodiment. More light incident to the side edge of the light guide 33 increases the brightness of the plane lamp.

Also as mentioned previously, because the light entering the gap is scattered or absorbed by the main supporter 31, the bright line is still considerably less when compared to the conventional art.

Figure 8:
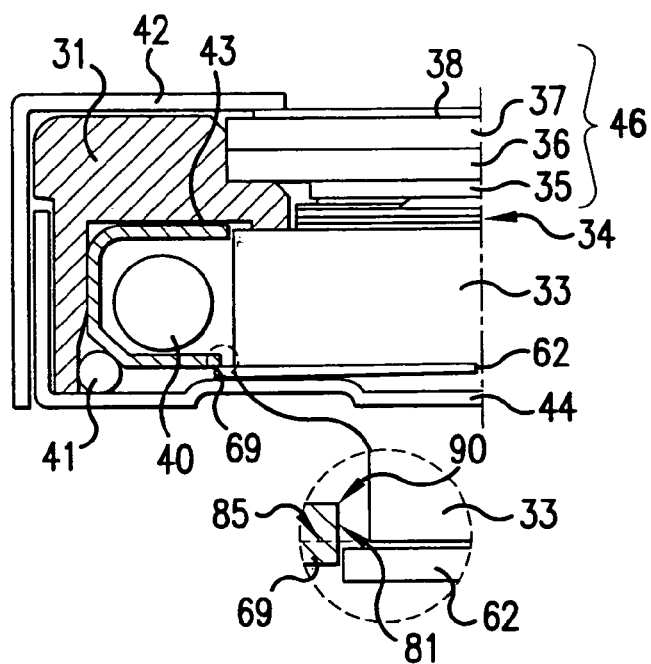
FIG. 8 is a sectional view showing a third embodiment of the present invention.

FIG. 8 is a view showing a third embodiment according to the present invention. Elements having the same structure as the first embodiment are represented with same reference numbers, and related explanations are omitted.

In this embodiment, a portion 81 of the edge of the lower extension of the lamp housing 69 faces the side edge of the light guide 33. That is, the lower extension of the lamp housing 69 is NOT entirely below the light guide 33. This structure prevents or minimizes black lines from occurring by preventing or minimizing the light from escaping through the space between the lower extension of the lamp housing 69 and the side edge of the light guide 33.

The embodiments discussed above all describe structures in which the upper extension of the lamp housing is spaced apart from the light guide to prevent collision between the lamp housing and the light guide. Additional measures as discussed previously and shown in FIG. 6 can be taken to further prevent collision.

The embodiments of the present invention have the following advantages. First, bright lines are prevented or minimized. This is accomplished by at least one of 1) minimizing the amount of light escaping through the gap between the upper extension of the lamp housing and the light guide, and 2) by absorbing or scattering by the main supporter of the escaped light.

Second, wrinkles are prevented or minimized since the sheet reflector is not stacked between the light guide and the lower extension of the lamp housing. This has the further advantage that the overall thickness of the backlight can be decreased by the thickness of the sheet reflector.

Third, deterioration of the liquid crystal panel is prevented or minimized due to heat transfer away from the liquid crystal panel by the main supporter, the bottom cover, and the top case.

Fourth, the brightness of the plane lamp is enhanced by maximizing the amount of light incident to the side edge of the light guide.

As many apparently widely different embodiments of this invention may be made without departing from the spirit and scope thereof, it is to be understood that the invention is not limited to the specific embodiments thereof.

What is claimed is:

1. A liquid crystal display device, comprising:
   a liquid crystal panel;
   a light guide disposed below said liquid crystal panel, said light guide having an end surface, an upper surface, and a lower surface;
   a lamp facing said end surface;
   a lamp housing having an inner side holding said lamp inside, said lamp housing including an upper end portion and a lower end portion; and
   a main supporter, a portion of which is between said lamp housing and said liquid crystal panel, said main supporter being connected to a lower side of said liquid crystal panel.

2. A liquid crystal display device according to claim 1, wherein said main supporter is on said upper surface and near said end surface of said light guide.

3. A liquid crystal display device according to claim 1, wherein said upper end portion of said lamp housing is affixed to said main supporter.

4. A liquid crystal display device according to claim 1, further comprising:
   a first cover shielding said lower surface of said light guide; and
   a second cover connecting an upper side of said liquid crystal panel and said first cover.

5. A liquid crystal display device according to claim 4, wherein said first cover is connected with said lamp housing.

6. A liquid crystal display device according to claim 4, wherein said first cover or said second cover includes a thermally conducting material.

7. A liquid crystal display device according to claim 1, wherein said main supporter includes a material scattering or absorbing a light.

8. A liquid crystal display device according to claim 1, wherein said main supporter includes a thermally insulating material.

9. A liquid crystal display device according to claim 1, wherein there is no vertical gap between a lower surface of said upper end portion of said lamp housing and said upper surface of said light guide.

10. A liquid crystal display device according to claim 1, wherein said lower surface of said upper end portion of said lamp housing is lower than said upper surface of said light guide.

11. liquid crystal display device according to claim 1, wherein the portion of said main supporter is on a part of said upper surface of said light guide, said main supporter also affixed to said upper end portion of said lamp housing.

12. An LCD device, comprising:
    a liquid crystal display panel;
    a light guide disposed below said liquid crystal display panel;
    a lamp housing including an upper extension, said upper extension being horizontally spaced apart from said light guide;
    a plurality of optical films above at least a portion of the upper surface of said light guide;
    a lamp light within said lamp housing;
    a lamp wire supplying power to said lamp light; and
    a main supporter on a side of and above said lamp housing, an end portion of said main supporter being above said light guide.

13. The LCD device of claim 12, wherein said lamp housing further includes a lower extension, said LCD device further comprising:
    a sheet reflector disposed below said guide light and horizontally spaced apart from said lower extension.

14. The LCD device of claim 13, wherein at least a portion of said lower extension is above a lower surface of said light guide.

15. The LCD device of claim 12, wherein said main supporter and said lamp housing are affixed to each other.

16. The LCD device of claim 15, wherein said main supporter and said lamp housing are affixed to each other by a double-sided adhesive tape.

17. The LCD device of claim 12, wherein said end portion of said main supporter extends beyond a side edge of said light guide and buttresses against said upper extension of said lamp housing.

18. The LCD device of claim 12, wherein said main supporter is made of a thermally insulating material.

19. The LCD device of claim 18, wherein said thermally insulating material is plastic.

20. The LCD device of claim 12, wherein said main supporter is made of a material that absorb or scatter light.

21. The LCD device of claim 12, further comprising:
    a bottom cover, made of a thermally conducting material, disposed below said lamp housing.

22. The LCD device of claim 21, further comprising:
    a top case, made of a thermally conducting material, disposed above said main supporter and said liquid crystal panel.

23. An LCD device, comprising:
    a liquid crystal display panel;

a light guide disposed below said liquid crystal display panel;

a lamp housing aside said light guide;

a main supporter on a side of and above said lamp housing, wherein said main supporter is thermally insulating;

a lamp light within said lamp housing; and a lamp wire supplying power to said lamp light.

24. The LCD device of claim 23, further comprising:

a bottom cover, made of a thermally conducting material, disposed below said lamp housing.

25. The LCD device of claim 24, further comprising:

a top case, made of a thermally conducting material, disposed above said main supporter and said liquid crystal panel.

26. A liquid crystal display device, comprising:

a liquid crystal panel;

a light guide disposed below said liquid crystal panel, said light guide having an end surface, an upper surface, and a lower surface;

a lamp facing said end surface;

a lamp housing having an inner side holding said lamp inside, said lamp housing including an upper end portion and a lower end portion; and a main supporter, a portion of which is between said lamp housing and said liquid crystal panel, said main supporter including a material scattering or absorbing a light.

27. A liquid crystal display device, comprising:

a liquid crystal panel;

a light guide disposed below said liquid crystal panel, said light guide having an end surface, an upper surface, and a lower surface;

a lamp facing said end surface;

a lamp housing having an inner side holding said lamp inside, said lamp housing including an upper end portion and a lower end portion; and a main supporter, a portion of which is between said lamp housing and said liquid crystal panel, said main supporter including a thermally insulating material.

28. A liquid crystal display device, comprising:

a liquid crystal panel;

a light guide disposed below said liquid crystal panel, said light guide having an end surface, an upper surface, and a lower surface;

a lamp facing said end surface;

a lamp housing having an inner side holding said lamp inside, said lamp housing including an upper end portion and a lower end portion; and a main supporter, a portion of which is between said lamp housing and said liquid crystal panel, the portion of said main supporter being on a part of said upper surface of said light guide, said main supporter being affixed to said upper end portion of said lamp housing.

* * * * *